United States Patent [19]

Ohzono et al.

[11] Patent Number: 4,679,677
[45] Date of Patent: Jul. 14, 1987

[54] HYDRAULIC TYPE STARTING CLUTCH

[75] Inventors: Kohei Ohzono, Fujimi; Kiyotaka Hayashi, Urawa; Mitsuru Saito, Koganei; Masaie Kato, Musashino; Yoshihiro Yoshida, Itabash; all of Japan

[73] Assignee: Honda Giken Kogyo K.K. (Honda Motor Co., Ltd. in English), Tokyo, Japan

[21] Appl. No.: 755,066

[22] Filed: Jul. 15, 1985

[30] Foreign Application Priority Data

Jul. 16, 1984 [JP] Japan ............................ 59-147341
May 9, 1985 [JP] Japan ............................ 60-96682

[51] Int. Cl.⁴ .................... F16D 25/02; F16D 25/063; B60K 41/28; B60K 41/02
[52] U.S. Cl. ............................................. 192/85 AA
[58] Field of Search ............ 192/85 AA, 0.076, 0.033, 192/52, 103 A, 103 FA, 105 F, 85 F

[56] References Cited

U.S. PATENT DOCUMENTS

| 2,297,480 | 9/1942 | Kratzmann | 192/85 A |
| 3,352,395 | 11/1967 | Hilpert | 192/103 FA |
| 3,447,397 | 6/1969 | Black et al. | 192/105 F X |
| 3,690,429 | 9/1972 | Honda | 192/113 B X |
| 4,487,303 | 12/1984 | Boueri et al. | 192/0.052 |

FOREIGN PATENT DOCUMENTS

| 11908 | 6/1980 | European Pat. Off. | 192/113 FA |
| 615534 | 1/1949 | United Kingdom | 192/105 D |

*Primary Examiner*—Rodney M. Bonck
*Assistant Examiner*—David A. Testardi
*Attorney, Agent, or Firm*—Arthur L. Lessler

[57] ABSTRACT

A hydraulic type starting clutch having an input rotating member rotatable in unison with an input shaft, an output rotating member rotatable in unison with an output shaft, and friction plates interposed between the input and output rotating members and adapted to transmit torque from the input rotating member to the output rotating member when engaged. An urging member urges the friction plates to cause transmission of torque from the input rotating member to the output rotating member, and a hydraulic pressure chamber is defined between the urging member and the output rotating member and supplied with a hydraulic fluid from a hydraulic fluid source. A control device controls a pressure regulating valve in a manner such that the pressure in the hydraulic pressure chamber is regulated to values dependent upon the rotational speed of the input shaft.

9 Claims, 16 Drawing Figures

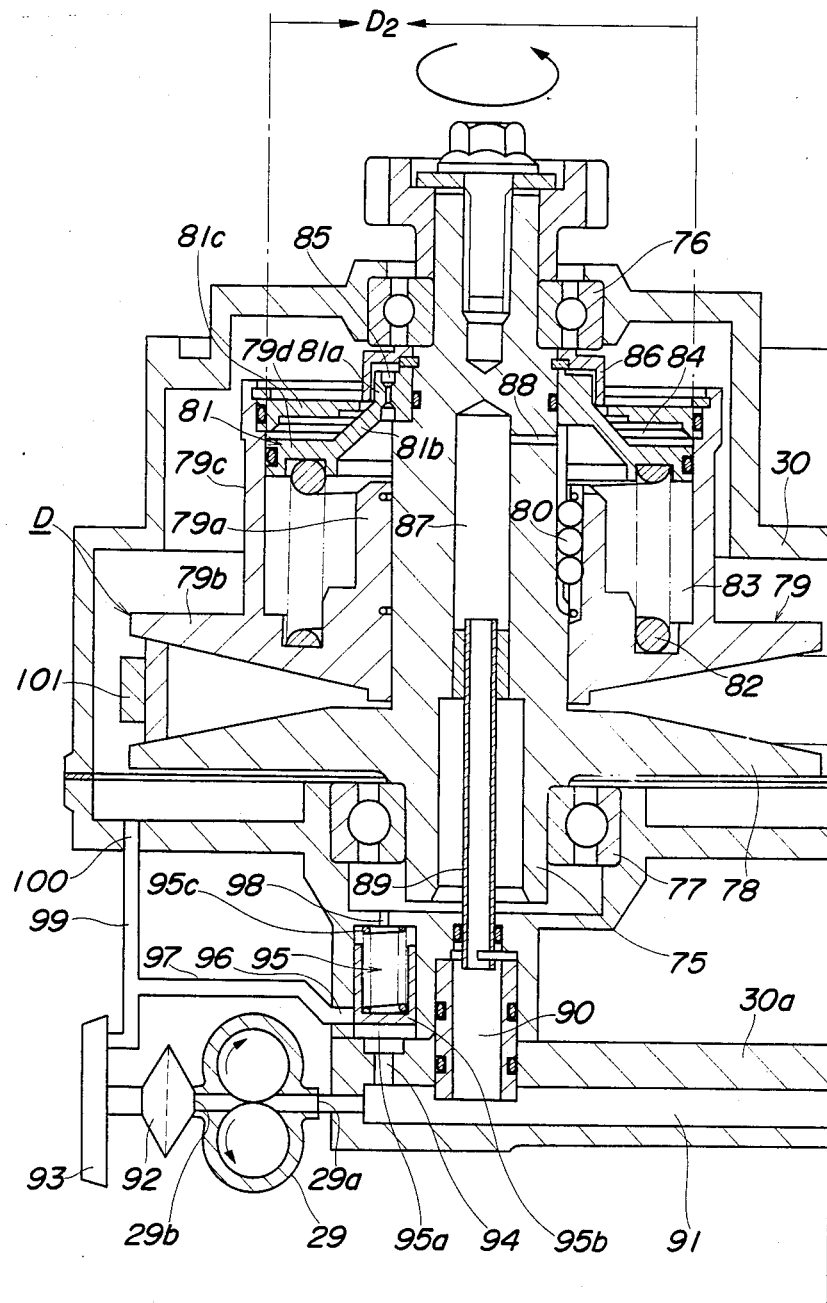

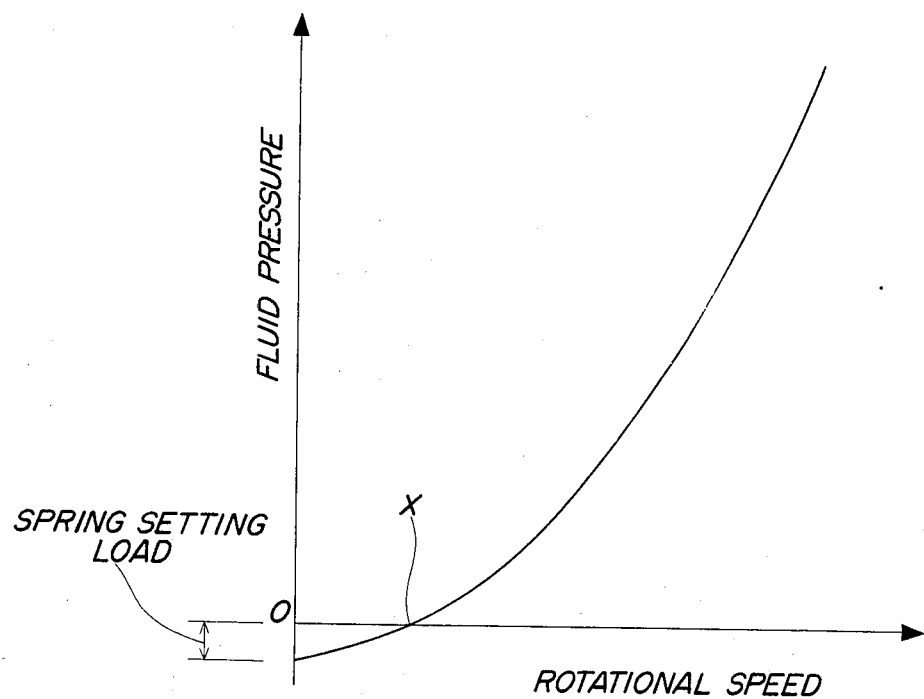

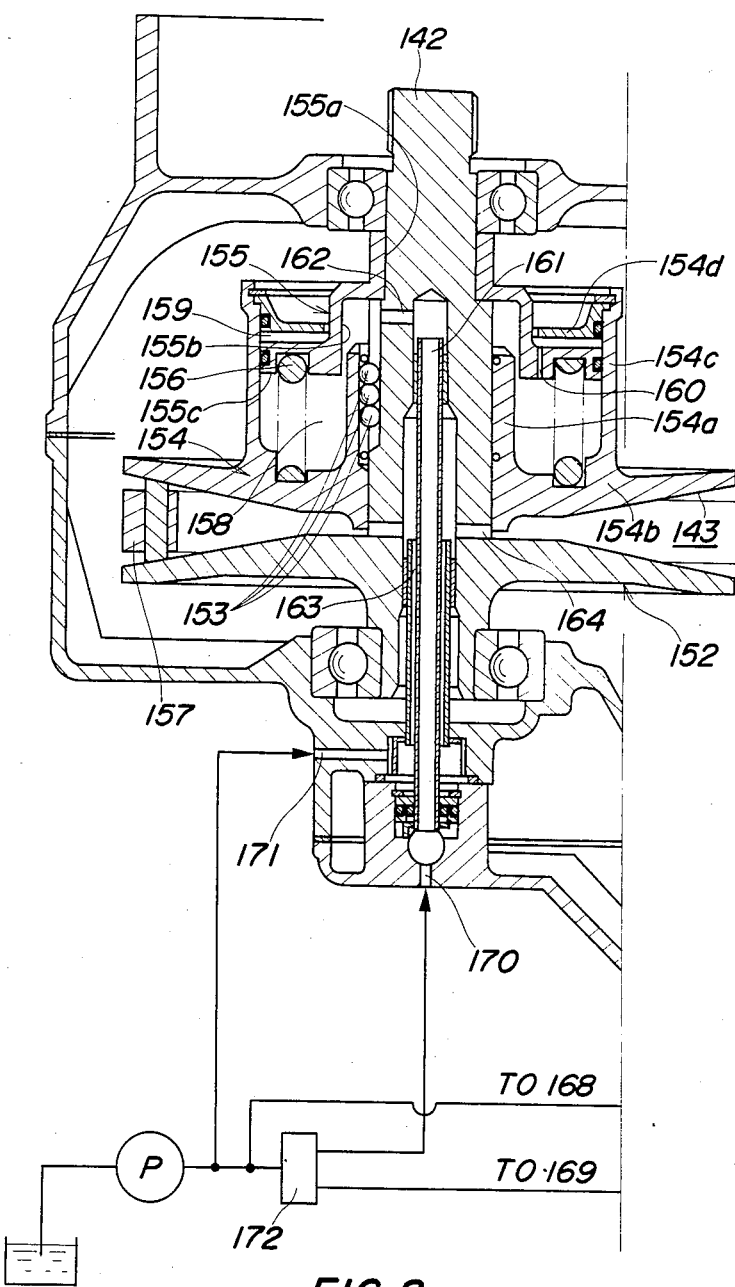

4,679,677

HYDRAULIC TYPE STARTING CLUTCH

BACKGROUND OF THE INVENTION

This invention relates to a hydraulic type starting clutch for use in an automatic transmission of infinitely variable speed type for automotive vehicles.

Conventionally, a starting clutch of this kind is known, e.g. from U.S. Pat. No. 3,171,524 which employs friction plates arranged to be urged against each other directly by a centrifugal force produced by a centrifugal governor. However, to obtain required transmission torque through this type clutch, the centrifugal governor has to be designed large in size. On the other hand, a conventional hydraulic type starting clutch, which is known, e.g. from U.S. Pat. No. 3,690,429, is constructed such that output pressure from an operating oil source per se is controlled to control the urging force applied to the friction plates, making the hydraulic pressure control system complicated in structure.

SUMMARY OF THE INVENTION

It is an object of the invention to provide a hydraulic type starting clutch which is simple in structure and compact in size, and capable of imparting a sufficient urging force to the friction plates for stable engagement thereof.

It is another object of the invention to provide a hydraulic type starting clutch which can remove heat from the friction plates when it is in a half-engaged state, to thereby cool the clutch.

It is a further object of the invention to provide a hydraulic type starting clutch which can be assembled with ease despite its compact size.

It is a still further object of the invention to provide a hydraulic type starting clutch which has an improved operating responsiveness.

It is a further object of the invention to provide a hydraulic type starting clutch which will not become fully engaged within a short period of time, to thereby provide smooth power transmission.

The invention provides a hydraulic type starting clutch having an input rotating member disposed to rotate in unison with an input shaft, an output rotating member disposed to rotate in unison with an output shaft, and friction plates interposed between the input rotating member and the output rotating member for frictional engagement therewith to transmit torque from the input rotating member to the output rotating member. Urging means is interposed between the friction plates and the output rotating member is adapted to urge the friction plates to cause transmission of torque from the input rotating member to the output rotating member. A hydraulic pressure chamber is defined between the urging means and the output rotating member and disposed to be supplied with a hydraulic fluid for acting upon the urging means to urge the friction plates. A hydraulic fluid source supplies the hydraulic fluid to the hydraulic pressure chamber. Pressure regulating valve means regulates the hydraulic fluid pressure in the hydraulic pressure chamber. Control means controls the pressure regulating valve means to regulate the hydraulic fluid pressure in the hydraulic pressure chamber to values dependent upon the rotational speed of the input shaft.

Preferably, the hydraulic pressure chamber has an outlet port for discharging the hydraulic fluid toward the friction plates, and the pressure regulating valve means is arranged at the outlet port.

Still preferably, the hydraulic type starting clutch includes restraining means for restraining the operation of the pressure regulating valve means, when the rotational speed of the input shaft increases above a predetermined value between a value at which the friction plates start to engage, and a value at which engagement of the friction plates is completed.

Still further preferably, the hydraulic pressure chamber has an inlet port and an outlet port, and the pressure regulating valve means is adapted to selectively open or close the inlet port and the outlet port.

The above and other objects, features and advantages of the invention will be more apparent from the ensuing detailed description taken in conjunction with the accompanying drawings.

BRIEF DESCRIPTION OF THE DRAWINGS

FIG. 7 is a graph showing the relationship between the rotational speed of the input shaft of the starting clutch in FIG. 3 and the operating fluid pressure;

DETAILED DESCRIPTION

The invention will now be described in detail with reference to the accompanying drawings illustrating embodiments thereof.

Figure 1B:
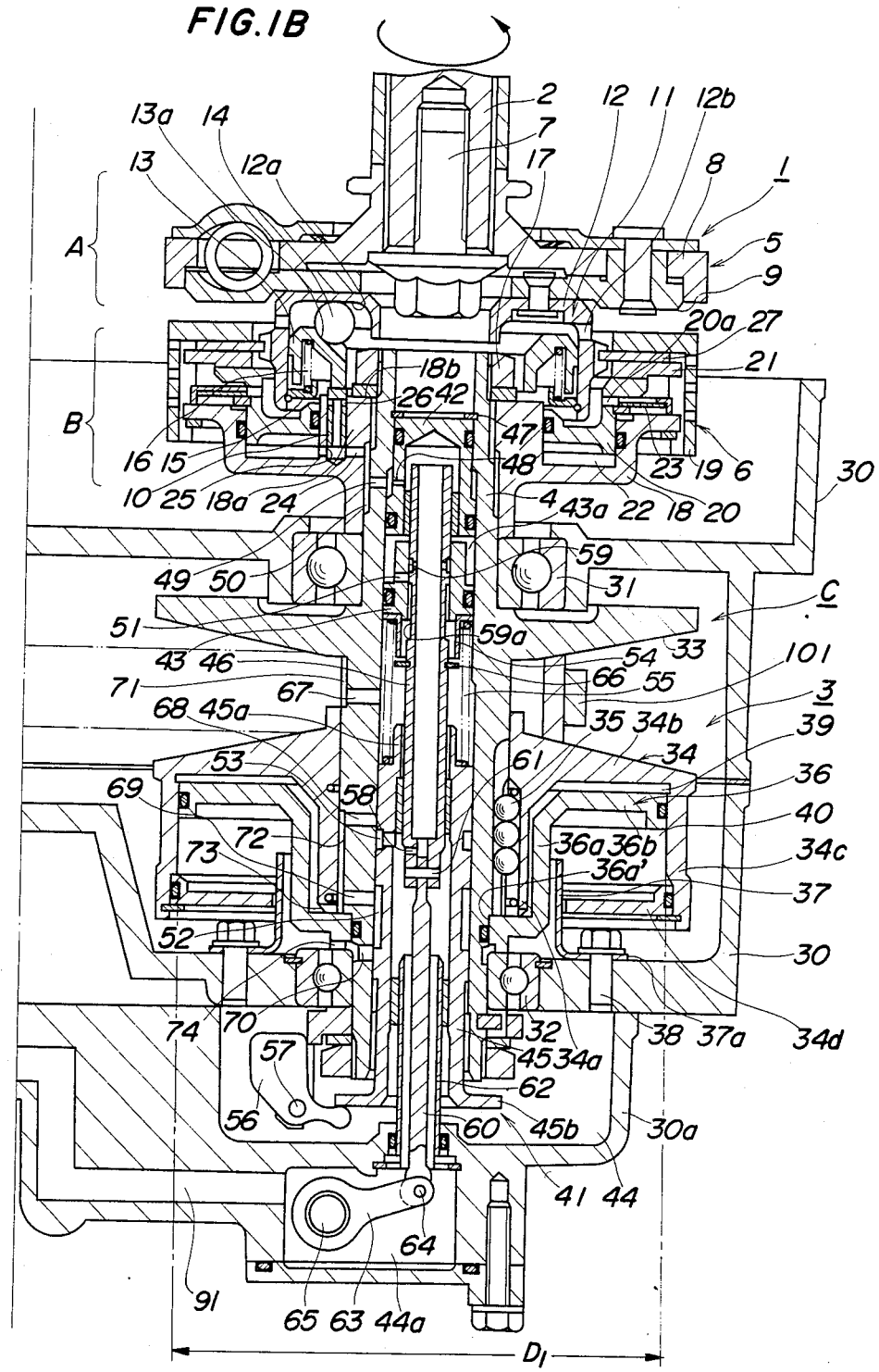
FIG. 1 consists of FIGS. 1a and 1b which show a sectional view of an automatic transmission of infinitely variable speed type equipped with a starting clutch according to the invention.

Referring first to FIG. 1, there is illustrated an automatic transmission of infinitely variable speed type for automotive vehicles, equipped with a starting clutch according to the invention. Reference numeral 1 designates a starting clutch which is interposed between an input shaft 2 coupled to an output shaft of an internal combustion engine, not shown, for rotation in unison therewith, and a drive shaft 4 of an automatic transmission 3, serving as an output shaft. The starting clutch 1 has an input rotating member 5 disposed to rotate in unison with the input shaft 2, and an output rotating member 6 disposed to rotate in unison with the drive shaft 4.

The input rotating member 5 comprises a disc 8 spline fitted on the input shaft 2 and secured thereto by means of a bolt 7, to which is attached a clutch damper 9 of a known type. Control means 11 for controlling a pressure regulating valve 10, hereinafter referred to, is mounted on the input rotating member 5 at its surface facing the output rotating member 6. The control, means 11 is of a centrifugal governor type and has an actuating means comprising a cam plate 13 axially slidably received within a housing 12 riveted to the input rotating member 5, and balls 14 radially movably interposed between a cam surface 13a of the cam plate 13 and a guide surface 12a of the housing 12. The cam plate 13 is urged toward the input rotating member 5 by a coiled spring 16 interposed between the cam plate 13 and a spring seat member 15. When the rotational speed of the input shaft 2 is lower than a predetermined value, the balls 14 is biased in a radially inner position whereby the cam plate 13 is urgedly biased toward the input rotating member 5 by the force of the spring 16. As the rotational speed of the input shaft 2 increases above the predetermined value, the balls 14 move radially outward due to its own centrifugal force to cause the cam plate 13 to be correspondingly displaced toward the output rotating member 6 against the urging force of the spring 16.

The output rotating member 6 comprises a clutch cylinder 18 spline fitted on the drive shaft 4 and secured thereto by means of a nut 17, and a clutch outer member 19 rigidly fitted on the clutch cylinder 18 in a manner prohibited from moving circumferentially or axially relative to the clutch cylinder 18. A clutch piston 20 as an urging member is axially slidably received within the cylinder 18 to be operated by a hydraulic fluid or pressurized oil introduced into a hydraulic pressure chamber 22 defined between the piston 20 and the cylinder 18, to urge clutch plates 21 and 27 as friction plates, hereinafter referred to. The piston 20 is urged by a belleville spring 23 toward the output rotating member 6, i.e. in a direction of disengaging the clutch.

The hydraulic pressure chamber 22 is supplied with hydraulic fluid via an inlet port 24 radially extending through a boss 18a of the cylinder 18. A bore 25 serving as an outlet port of the hydraulic pressure chamber 22 is axially formed through the boss 18a of the cylinder 18, within which the aforementioned pressure regulating valve 10 is slidably received. The bore 25 communicates at one end with the inlet port 24 and opens at its other end in an end face 18b of the boss 18a of the cylinder 18 facing the input rotating member 5. The pressure regulating valve 10 can move through a predetermined stroke in the axial direction of the drive shaft 4, and comprises a hollow cylindrical valve body having an open end adjacent the inlet port 24 and 9 closed other end. The closed end of the pressure regulating valve 10 is normally held in contact with an end face of the cam plate 13 facing the output rotating member 6, by the pressure of hydraulic fluid. Radial outlet ports 26 are formed through the peripheral wall of the hollow valve body 10 at a location in the vicinity of its closed end.

When the rotational speed of the input shaft 2 is lower than the predetermined value, the pressure regulating valve 10 is biased toward the input rotating member 5 by the hydraulic fluid supplied through the inlet port 24, whereby the outlet ports 26 are open to discharge the hydraulic fluid within the hydraulic pressure chamber 22 through the outlet ports 26. Therefore, the pressure in the chamber 22 is not so high, thereby holding the piston 20 in a position biased toward the output rotating member 6 by the urging force of the spring 23. On the other hand, when the rotational speed of the input shaft 2 is higher than the predetermined value, the pressure regulating valve 10 is urgedly displaced by the cam plate 13 toward the output rotating member 6, to thus reduce the opening area of the outlet ports 26, whereby the pressure in the hydraulic pressure chamber 22 is regulated in dependence on the ratio in opening area between the outlet ports 26 and an orifice 48 hereinafter referred to.

The clutch plate 21, which is disposed to be urged by the piston 20, is interposed between the input and output rotating members 5 and 6, and fitted in the clutch outer member 19 in urging contact with its inner peripheral surface in a manner circumferentially immovable but axially movable relative to the clutch outer member 19. The other clutch plate 27 is interposed between the clutch plate 21 and an inner or lower end face of the clutch outer member 19, and fitted on the housing 12 in a manner such that it can move axially but is prohibited from moving circumferentially relative to the housing 12. When the piston 20 is actuated to urge the clutch plate 21 against the clutch outer member 19 via the clutch plate 27, torque is transmitted from the input rotating member 5 to the output rotating member 6, while the piston 20 is returned, power transmission between the input and output rotating members 5, 6 is interrupted.

The governor housing 12 and the clutch piston 20 have their respective peripheral walls formed with hydraulic fluid distributing bores 12b and 20a, which are so located that the hydraulic fluid discharged from the hydraulic pressure chamber 22 via the outlet ports 26 and delivered to the interior of the housing 12 or the space between the housing 12 and the piston 20 is introduced via the distribution bores 12b or 20a to the sliding portions of the clutch plates 21, 27, to thereby sufficiently cool the clutch particularly when the clutch plates 21, 27 are in a half-engaged state. The inlet port 24 is connected via hydraulic fluid selector valve means 41 incorporated in the automatic transmission 3, hereinafter referred to, to an oil pump 29 as a hydraulic fluid supply source, which is driven by the engine.

The starting clutch 1 is composed of an input assembly A and an output assembly B; the input assembly comprises the input shaft 2, the input rotating member 5 (disc 8), the bolt 7, the damper 9, and the control means 11 including the governor housing 12, the cam plate 13, the balls 14, the spring seat member 15 and the spring 16, while the output assembly B comprises the drive shaft 4, the output rotating member 6 including the cylinder 18 and the clutch outer member 19, the pressure regulating valve 10, the piston 20, the clutch plate 21, the spring 23, and the clutch plate 27. The input and output assemblies A, B are individually assembled, and then put together with the clutch plate 27 aligned with the governor housing 12, thereby completing the assemblage of the clutch with ease.

The arrangement of the automatic transmission 3 equipped with the starting clutch 1 constructed as above will now be described. The drive shaft 4, formed by a hollow shaft having opposite open ends, is rotatably supported at its opposite open ends by side walls of a transmission box 30 via ball bearings 31 and 32. Arranged within the box 30 is a driving pulley C which is mounted on the drive shaft 4 and has a pitch variable through control of the fluid pressure.

The driving pulley C comprises a disc-shaped stationary element 33 formed integrally on the drive shaft 4 of the starting clutch 1, and a movable element 34 arranged opposite the stationary element 33 and fitted via a plurality of balls 35 on the drive shaft 4 in a manner axially movable but circumferentially immovable relative to the drive shaft 4. The movable pulley element 34 has a cylindrical boss 34a, a disc-shaped main body 34b projecting integrally from one end of the boss 34a, a cylindrical peripheral wall 34c axially projecting integrally from the outer periphery of the main body 34b in a direction away from the immovable conical disc element 33, and an annular plate 34d secured to the inner peripheral surface of a projecting end of the peripheral wall 34c.

Received within the movable pulley element 34 is a stationary piston 36 which has a cylindrical body 36a having one end wall formed with a fitting central bore 36a' and opening at its other end, and an annular radial flange 36b projecting integrally from the other open end of the cylindrical body 36a. The stationary piston 36 is circumferentially and axially immovably fitted on the drive shaft 4 at its fitting bore 36a', and its cylindrical body 36a is loosely fitted around the boss 34a of the movable pulley element 34, while the flange 36b has its outer peripheral surface slidably received in the cylindrical peripheral wall 34c of the movable pulley element 34 in a liquidtight manner. Arranged between a central bore of the annular plate 34d and the cylindrical body 36a of the stationary piston 36 is a hollow cylindrical guide member 37 which has opposite open ends, one of which has a mounting flange 37a secured to an inner side wall surface of the transmission box 30 by means of bolts 38.

A first hydraulic pressure chamber 39 is defined between the main body 34b of the movable pully element 34 and the flange 36b of the stationary piston 36, while a second hydraulic pressure chamber 40 is defined between the closing plate 34d of the movable pulley element 34 and the flange 36b of the stationary piston 36. These first and second hydraulic pressure chambers 39, 40 are connected through the selector valve means 41 to the oil pump 29.

The hydraulic fluid selector valve means 41 has a bearing cylinder 42 rigidly fitted in one end portion of the drive shaft 4 adjacent the starting clutch 1, a first valve body 43 slidably received within the drive shaft 4 at a location adjacent the bearing cylinder 42 for axial displacement through a predetermined stroke, a second valve body 45 slidably received in the drive shaft 4 for axial displacement through a predetermined stroke and having one end disposed opposite the first valve body 43 and the other end projected into a governor chamber 44 defined outside the one side wall of the transmission box 30, and a third valve body 46 slidably fitted through the bearing cylinder 42, the first valve body 43 and the second valve body 45.

The bearing cylinder 42, which has a closed bottom wall and an open opposite end, is held in position by a stop ring 47 and received in the drive shaft 4 in a liquid-tight manner. The aforementioned orifice or restriction 48 radially extends through the peripheral wall of the bearing cylinder 42 at a predetermined axial location, and communicates with the inlet port 24 of the hydraulic pressure chamber 22 of the starting clutch 1 through a first port 49 radially extending through the peripheral wall of the drive shaft 4, and a gap defined between an annular groove 50 formed in the outer peripheral surface of the drive shaft 4 and the inner peripheral surface of the boss of the clutch cylinder 18.

The first valve body 43 is formed by a cylindrical member with opposite open ends and slidably received at its enlarged end portion within the drive shaft 4 in a liquidtight manner. A hydraulic pressure chamber 43a is defined between the outer peripheral surface of a smaller diameter portion of the first valve body 43 and the inner peripheral surface of the drive shaft 4, and a radial port 51 is formed through the peripheral wall of the smaller diameter portion of the valve body 43 and opens into the hydraulic pressure chamber 43a.

The second valve body 45 is an elongate cylindrical member with opposite open ends, and formed with an annular groove 52 having a predetermined axial length at its axially intermediate portion and a radial port 53 arranged on the side of the first valve body 43 with respect to the annular groove 52 at a predetermined distance therefrom. The second valve body 45 has a smaller diameter portion 45a serving as a spring seat formed at one end thereof facing the first valve body 43. A coiled spring 55 is interposed between the spring seat portion 45a of the second valve body 45 and a spring seat member 54 attached to one end of the first valve body 43 facing the second valve body 45, to urge the first and second valve bodies 43, 45 away from each other, that is, the first valve body 43 toward the starting clutch 1 while the second valve body 45 away from the clutch 1. The second valve body 45 has an enlarged flange 45b formed integrally at its one end projected into the governor chamber 44, against which a governor weight 56 abuts. The governor weight 56 is disposed to pivot about its fulcrum 57 in the counterclockwise direction with an increase in the rotational speed of the engine, to displace the second valve body 45 toward the starting clutch 1 against the urging force of the spring 55.

The third valve body 46 is an elongate cylindrical member opening at one end adjacent the starting clutch 1 and closed at its other end remote from the clutch 1, and slidably fitted through the bearing cylinder 42, the first valve body 43 and the second valve body 45 in a liquidtight manner. The third valve body 46 has a first port 58 radially extending through the peripheral wall of its end portion remote from the starting clutch 1, and a second port 59 radially extending through the peripheral wall of the end portion adjacent the clutch 1. An annular groove 59a is formed in the outer peripheral surface of the third valve body 46 at a location between the first and second ports 58 and 59. The port 51 in the first valve body 43 is disposed to selectively communicate with the second port 59 or with the annular groove 59a.

Connected to the end portion of the third valve body 46 remote from the starting clutch 1 is one end of a rod 61 which is loosely fitted through a hydraulic fluid introducing pipe 62 having opposite open ends, and has its other end projected outside the pipe 62 and pivotably connected to an accelerator control fork 63 by means of a pin 64. The pipe 62 has one end secured to an outer wall 30a of the governor chamber 44 and the other end slidably fitted through the second valve body 45 in a liquidtight manner. The accelerator control fork 63 is arranged in a chamber 44a defined outside the governor chamber 44, and connected to the throttle valve, not shown, of the engine for pivotal movement about the fulcrum 65. As the opening of the throttle valve increases, the fork 63 pivots in the clockwise direction to displace the third valve body 46 away from the starting clutch 1. The control fork chamber 44a communicates via the hydraulic fluid introducing pipe 62 with the interior of the second valve body 45. The third valve body 46 has its outer peripheral surface provided with a ring stopper 66 against which the spring seat member 54 of the first valve body 43 can abut, so that the first valve body 43 is promptly displaced by the ring stopper 66 without delay when the throttle valve is suddenly closed.

The drive shaft 4 has second, third, fourth and fifth ports 67, 68, 69 and 70 radially extending through its peripheral wall and longitudinally arranged in the order mentioned at locations between an axially intermediate portion and an end portion remote from the starting clutch 1. When the pitch of the driving pulley C is maximum, that is, the axial distance between the immovable conical disc element 33 and the movable pulley element 34 assumes the maximum value, the second port 67 is located nearly at the middle point between the two pulley elements 33, 34 and opens into the transmission box 30. On the other hand, when the pitch of the driving pulley C assumes the minimum value, that is, the axial distance between the stationary and movable pulley elements 33 and 34 assumes the minimum value, although the boss 34a of the movable pulley element 34 closes the second port 67, communication between the second port 67 and the transmission box 30 is ensured by a groove 71 formed in the outer peripheral surface of the drive shaft 4. The third port 68 is located at an almost axially central portion of the boss 34a of the movable pulley element 34 when the pitch of the driving pulley C assumes the maximum value, and located adjacent the end of the boss 34a remote from the starting clutch 1 when the gap of the driving pulley C is the minimum.

The third and fourth ports 68, 69 communicate with the first hydraulic pressure chamber 39 defined between the main body 34b of the movable pulley element 34 and the flange 36b of the stationary piston 36, through a gap defined between the inner peripheral surface of the boss of the movable pulley element 34 and an annular groove 72 formed in the outer peripheral surface of the drive shaft 4, and a gap defined between the end face of the boss 34a of the movable pulley element 34 and the inner or upper end face of the cylindrical body 36a of the stationary piston 36. An annular chamber 73 is formed the peripheral edge of the lower end face of the boss 34a of the movable pulley element 34, to ensure communication between the annular groove 72 and the first hydraulic pressure chamber 39 when the pitch of the driving pulley C is the maximum, that is, the lower end face of the boss 34a is in contact with the inner or upper end face of the cylindrical body 36a of the stationary piston 36. The third port 68 is disposed to communicate with the port 53 of the second valve body 45 as hereinafter described. The fifth port 70 is located between the outer or lower end face of the cylindrical body 36a of the stationary piston 36 and the bearing 32, and communicates through a notch 74 formed in the outer end face of the cylindrical body 36a and the guide cylinder 37, with the second hydraulic pressure chamber 40 defined between the closing plate 34d of the movable pulley element 34 and the flange 36b of the stationary piston 36. The fourth and fifth ports 69 and 70 can communicate with each other via the annular groove 52 formed in the outer peripheral surface of the second valve body 45, as hereinafter described.

A driven shaft 75 is rotatably supported by the opposite side walls of the transmission box 30 via ball bearings 76 and 77. Arranged within the box 30 is a driven pulley D which is mounted on the driven shaft 75 and has a pitch variable through control of the fluid pressure. The driven pulley D comprises a stationary element 78 formed integrally on the driven shaft 75, and a movable element 79 arranged opposite the stationary element 78 and fitted via a plurality of balls 80 around the outer periphery of the driven shaft 75 in a manner axially movable but circumferentially immovable relative to the driven shaft 75.

The movable pulley element 79 has a cylindrical boss 79a, a disc-shaped main body 79b projecting integrally from one end of the boss 79a, a cylindrical peripheral wall 79c axially projecting integrally from a radially intermediate portion of the main body 79b in a direction away from the immovable conical disc element 78, and an annular plate 79d secured to an inner peripheral surface of the projecting end of the peripheral wall 79c.

Received within the movable pulley element 79 is a stationary piston 81 which has a boss 81a, a tapered portion 81b projecting integrally from one end of the boss 81a and having an enlarged end, and an annular radial flange 81c projecting integrally from the enlarged end of the tapered portion 81b. The stationary piston 81 is circumferentially and axially immovably fitted on the driven shaft 75 at its boss 81a, and its radial flange 81c has its outer peripheral surface slidably received in the cylindrical peripheral wall 79c of the movable pulley element 79 in a liquidtight manner. A coiled spring 82 is interposed between the main body 79b of the movable pulley element 79 and the flange 81c of the stationary piston 81, to urge the movable pulley element 79 toward the immovable conical element 78, i.e. in a direction of reducing the pitch of the driven pulley D. The spring 82 serves to keep the belt properly taut and bring the movable pulley element 79 to an initial or low speed position when the engine is at rest.

A first hydraulic pressure chamber 83 is defined between the main body 79b of the movable pully element 79, and the tapered portion 81b and flange 81c of the stationary piston 81, while a second hydraulic pressure chamber 84 is defined between the closing plate 79d of the movable pulley element 79 and the tapered portion 81b and flange 81c of the stationary piston 81. These first and second hydraulic pressure chambers 83, 84 communicate with each other via an orifice 85 axially formed through the boss 81a of the stationary piston 81, and the interior of a guide cylinder 86 loosely fitted between the boss 81a and the closing plate 79d of the movable pulley element 79.

The guide cylinder 86 is rigidly fitted on the driven shaft 75 for rotation in unison therewith. The first hydraulic pressure chamber 83 is communicated with a hydraulic fluid introducing passage 87 formed through the driven shaft 75 along its axis, via a communication hole 88 radially extending through the peripheral wall of the driven shaft 75. The passage 87 is connected via a hydraulic fluid introducing pipe 89 having opposite open ends, to a hydraulic fluid inlet port 90. The pipe 89 has its one end fitted through the passage 87 in the driven shaft 75 in a liquidtight manner, and the other end fitted in a liquidtight manner through a wall portion of the transmission box 30 at a location between the bearing 77 and the inlet port 90. The inlet port 90 communicates with a hydraulic fluid supply passage 91 connecting a discharge port 29a of the pump 29 to the control fork chamber 44a. The pump 29 has its suction port 29b connected to a fluid tank 93 via a filter 92.

The hydraulic fluid supply passage 91 communicates at a portion thereof upstream of the inlet port 90 with a valve chamber 95a of a regulator valve 95. The regulator valve 95 is adapted to maintain the line pressure of the hydraulic fluid delivered from the pump 29 at a constant value, and has a valve body 95b slidably received within the valve chamber 95a for opening and closing a port 96, and a spring 95c urging the valve body 95b toward its closed position. The port 96 is connected via a communication pipe 97 to the fluid tank 93. The valve chamber 95a also communicates with the interior of the transmission box 30 through an orifice 98 formed in a wall portion of the box 30 and located opposite the communication passage 94. When the pressure of fluid delivered from the pump 29 is smaller than the urging force of the spring 95c, the port 96 is blocked by the valve body 95b, while when the fluid pressure exceeds the urging force of the spring 95c, the valve body 95b is displaced to open the port 96, whereby part of the hydraulic fluid is drained to the fluid tank 93 through a communication pipe 97. A return pipe 99 communicates a communication hole 100 formed through a side wall of the transmission box 30 with the fluid tank 93, to return the fluid stored in the transmission box 30 to the tank 93.

An endless belt 101, formed of a metal such as steel, is wound around the driving pulley C and the driven pulley D, to transmit torque from the former to the latter. The speed reduction ratio between these two pulleys C, D can be varied in an infinite or stepless manner by changing the pitches of the pulleys C, D.

The cylinder bore of the movable pulley element 34 of the driving pulley C, i.e. the inner diameter D1 of the cylindrical peripheral wall 34c, is set at a value larger than the cylinder bore of the movable pulley element 79 of the driven pulley D, i.e. the inner diameter D2 of the cylindrical peripheral wall 79c, that is, D1>D2.

OPERATION

The operation of the starting clutch according to the invention and the automatic transmission will now be described.

(1) At the Start of Engine

When the output shaft of the engine starts rotating, the input shaft 2 of the starting clutch 1 and accordingly the input rotating member 5 and the control means 11 rotate in unison with the engine output shaft. However, on this occasion, the pressure of fluid supplied from the pump 29 is low and the rotational speed of the input shaft 2 is lower than the predetermined value. Therefore, the centrifugal force acting upon the governor balls 14 of the control means 11 is not large enough to overcome the force of the spring 16 urging the cam plate 13, whereby the outlet ports 26 of the pressure regulating valve 10 remain open. The second valve body 45 is then in a position as illustrated in FIG. 1, with its port 53 disconnected from third port 68 of the drive shaft 4. The first hydraulic pressure chamber 39 of the driving pulley C is communicated with the second hydraulic pressure chamber 40 of same through the groove 73 of the movable pulley element 34, the annular groove 72, the fourth port 69 of the drive shaft 4, the annular groove 52 of the second valve body 45, the fifth port 70 of the drive shaft 4, and the groove 74 of the stationary piston 36. The third valve body 46 is also in a position as illustrated, with its second port 59 disconnected from the port 51 of the first valve body 43. Therefore, the hydraulic fluid from the pump 29 is first supplied through the hydraulic fluid supply passage 91, the inlet port 90, the hydraulic fluid introducing pipe and passage 89, 87, and the communication hole 88, to the first hydraulic pressure chamber 83 of the driven pulley D to fill same with hydraulic fluid, and then delivered to the hydraulic pressure chamber 22 of the starting clutch 1 through the passage 91, the control fork chamber 44a, the hydraulic fluid introducing pipe 62, the interior of the second valve body 45, the first port 58 of the third valve body 46, the interior of the third valve body 46, the interior of the bearing cylinder 42, the orifice 48 of the bearing cylinder 42, the first port 49 of the drive shaft 4, the gap between the clutch cylinder 18 and the annular groove 50 of the drive shaft 4, and the inlet port 24 of the clutch cylinder 18. However, on this occasion the pressure regulating valve 10 is biased by the hydraulic fluid toward the input rotating member 5 with its outlet ports 26 open, thus allowing discharge of the hydraulic fluid through the outlet ports 26 into the interior of the governor housing 12. Therefore, the pressure in the hydraulic pressure chamber 22 of the starting clutch 1 does not increase and accordingly the clutch piston 20 does not urge the clutch plate 21, whereby no torque is transmitted from the input shaft 2 of the clutch 1 to the drive shaft 4, thus holding the driving pulley C and the driven pulley D stationary.

Since the port 53 of the second valve body 45 is then disconnected from the third port 68 of the drive shaft 4 as noted before, no hydraulic fluid is supplied to the first hydraulic pressure chamber 38 of the driving pulley C. Consequently, the movable pulley element 34 is biased in the position remotest from the immovable conical disc element 33, whereby the maximum pitch is assumed by the driving pulley C as shown in FIG. 1.

On the other hand, the hydraulic fluid introduced into the first hydraulic pressure chamber 83 of the driven pulley D from the pump 29 cooperates with the spring 82 to displace the movable pulley element 79 into the position closest to the immovable conical disc element 78, to thereby obtain the minimum gap of the driven pulley D as illustrated.

Thus, the driving pulley C is engaged by the belt 101 at its radially innermost portion, while the driven pulley D is engaged by the belt 101 at its radially outermost portion, providing a largest reduction ratio for the transmission.

(2) At the Start of Vehicle

As the accelerator pedal, not shown, of the engine is gradually stepped on to increase the opening of the throttle valve after the start of the engine, the rotational speed of the engine is correspondingly increased. When the engine rotational speed reaches the predetermined value, the centrifugal force acts upon the governor balls 14 to become large enough to radially outwardly displace same to urge the cam plate 13 away from the input rotating member 5 against the urging force of the spring 16, so that the pressure regulating valve 10 is displaced by the cam plate 13 away from the input rotating member 5, i.e. in the direction of closing its outlet ports 26. Therefore, the pressure in the first hydraulic pressure chamber 22 increases to urgingly displace the clutch piston 20 toward the input rotating member 5, which in turn urges the clutch plate 21 against the inner end face of the clutch outer member 19 via the clutch plate 27, whereby torque is transmitted from the input shaft 2 to the drive shaft 4. The driving pulley C thus rotates in unison with the rotating drive shaft 4, and the rotation of the driving pulley C is transmitted via the belt 101 to the driven pulley D which thus rotates in unison with the driven shaft 75, to rotate the driving wheel(s), not shown, of the vehicle with the transmission in the lowest speed reduction ratio position.

(3) At Acceleration of Vehicle

As the accelerator pedal is stepped on after the start of the vehicle to increase the throttle valve opening, the engine speed becomes larger than a predetermined value, the governor weight 56 pivots in the counterclockwise direction to displace the second valve body 45 toward the starting clutch 1 against the urging force of the spring 55, whereby the port 53 of the second valve body 45 is registered with the third port 68 of the drive shaft 4, while communication between the fourth and fifth ports 69, 70 of the drive shaft 4 via the annular groove 52 is interrupted. The hydraulic fluid in the second valve body 45 now flows through the port 53, the third port 68 of the drive shaft 4, the annular groove 72, and the notch 73 of the boss 34a of the movable pulley element 34 into the first hydraulic pressure chamber 39 to increase the internal pressure of the same chamber 39. The increased fluid pressure in the first hydraulic pressure chamber 39 causes the movable pulley element 34 to be displaced from the illustrated position toward the immovable conical disc element 33, thereby reducing the pitch of the driving pulley C to forcedly move the belt 101 radially outwardly of the pulley C. Since the cylinder bore D1 of the movable pulley element 34 of the driving pulley C is larger than the cylinder bore D2 of the movable pulley element 79 of the driven pulley D, as mentioned before, the belt 101 applies a larger pressure upon the driving pulley C than upon the driven pulley D. As a result, as the belt 101 moves radially outwardly of the driving pulley C, the movable pulley element 79 of the driven pulley D is displaced away from the immovable conical disc element 78 against the fluid pressure in the first hydraulic pressure chamber 83 and the urging force of the spring 82, to thereby allow the belt 101 to be moved radially inwardly of the driven pulley D, increasing the rotational speed of the driven pulley D from a low speed to a middle or a high speed in a stepless manner. That is, the transmission provides a middle speed for the driven pulley D when the belt 101 is positioned at radially central portions of both the driving and driven pulleys C, D, i.e. the pitches of the pulleys C, D are both medium, and provides a high speed for the driven pulley D when the belt 101 is positioned at a radially outermost portion of the driving pulley C with the smallest pitch and at the same time positioned at a radially innermost portion of the driven pulley D with the largest pitch.

(4) At Deceleration of Vehicle

When the accelerator pedal is returned from its stepped position to decrease the throttle valve opening, the belt 101 is displaced radially inwardly of the driving pulley C and radially outwardly of the driven pulley D, thus causing deceleration of the vehicle.

(5) At Sudden Start of Vehicle

When vehicle is accelerated in a normal manner by gradually stepping on the accelerator pedal to gradually increase the throttle valve opening, the acceleration control fork 63 coupled to the accelerator pedal pivots in the clockwise direction to slightly displace via the rod 60 the third valve body 46 away from the starting clutch 1, i.e. downward as viewed in FIG. 1, from the illustrated position, whereby the second port 59 of the third valve body 46 slightly overlaps with the port 51 of the first valve body 43, allowing a small amount of hydraulic fluid to be supplied from the interior of the third valve body 46 to the hydraulic pressure chamber 43a defined between the drive shaft 4 and the first valve body 43 through aligned the ports 59, 51. The hydraulic fluid supplied to the hydraulic pressure chamber 43a causes displacement of the first valve body 43 away from the starting clutch 1 to disconnect its port 51 from the second port 59 of the third valve body 46, to be then stopped and held stationary. This means an increase in the urging force of the spring 55 by an amount corresponding to the displacement of the first valve body 43, thereby slightly restraining the movement of the governor weight 56.

When the accelerator pedal is released from its stepped position to decrease the throttle valve opening, the acceleration control fork 63 is also correspondingly returned to its initial position. The port 51 of the first valve body 43 is now communicated with the annular groove 59a of the third valve body 46 over a slight area, to allow hydraulic fluid in the hydraulic pressure chamber 43a to drain into the transmission box 30 via the port 51, the annular groove 59a, the gap between the third valve body 46 and the drive shaft 4, and the second port 67 of the drive shaft 4 resulting in displacement of the first valve body 43 toward the starting clutch 1, i.e. upward as viewed in FIG. 1, to interrupt the communication between the port 51 and the annular groove 59a.

In this manner, when the accelerator pedal is operated slowly, the resulting change in the throttle valve opening does not largely affect the movement of the governor. However, when the accelerator pedal is suddenly stepped on to cause an abrupt increase in the throttle valve opening, the third valve body 46 is largely moved away from the starting clutch 1 to cause overlapping of its second port 59 with the port 51 of the first valve body 43 over a large area, thereby allowing a larger amount of the hydraulic fluid to be supplied to the hydraulic pressure chamber 43a. The pressure in the hydraulic pressure chamber 43a thus increases largely above the force of the spring 55 to cause a sudden and large movement of the first valve body 43 away from the starting clutch 1. This sudden movement of the first valve body 43 has much influence over the governor operation, that is, it causes pivotal movement of the governor weight 56 in the clockwise direction, finally moving the pulleys C, D, i.e. the belt 101, into a lower speed-providing position. The governor operation described above can be obtained by setting the overlapping amount of the ports 51, 59, the amount of pivotal displacement of the governor weight 56, the force of the spring 55 etc. at respective suitable values.

When the hydraulic fluid is drained from the first hydraulic pressure chamber 39 into the second hydrualic pressure chamber 40 while the driving pulley C is moving toward a lower speed-providing position, the fluid is biased to a radially outer portion of the second hydraulic pressure chamber 40 due to centrifugal force acting thereupon, whereby the biased fluid forms a reaction to the force acted upon the flange 36b of the stationary piston 36 by the pressure within the first hydraulic pressure chamber 39, thus balancing loads acting upon the opposite end faces of the flange 36b. Similarly, the hydraulic fluid which flows from the first hydraulic pressure chamber 83 of the driven pulley D to the second hydraulic pressure chamber 84 via the orifice 85, is centrifugally biased to a radially outer portion of the second hydraulic pressure chamber 84, thereby balancing loads acting upon the opposite end faces of the flange 81c of the stationary piston 81.

When the first valve body 43 is displaced to such a position as to communicate its port 51 with the annular groove 59a of the third valve body 46, hydraulic fluid in the hydraulic pressure chamber 43a is drained through the port 51 and the annular groove 59a into the transmission box 30, so that the first and second valve bodies 43, 45 are returned to the initial positions by the resultant force of the governor weight 56 and the spring 55. Therefore, hydraulic fluid in the first hydraulic pressure chamber 39 is prevented from flowing into the second hydraulic pressure chamber 40, to thereby impede further movement of the driving pulley C toward a lower speed-providing position, that is, excessive deceleration.

Figure 2:
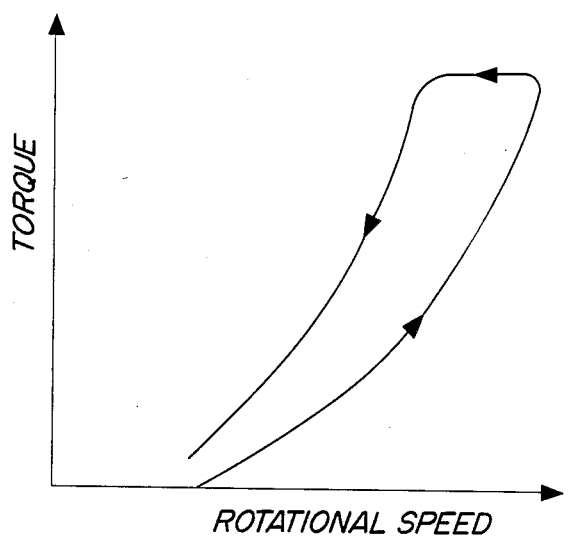
FIG. 2 is a graph showing a torque transmission capacity-rotational speed characteristic obtained by the starting clutch of the invention.

Further, as stated before, the control means 11 and the clutch piston (urging means) 20 are mounted, respectively, on the input shaft 2 and the output shaft 4, while the pressure regulating valve 10 is arranged in the vicinity of the central boss of the clutch cylinder 18. Therefore, at the start of the engine, the input shaft 2 alone rotates and the output shaft 4 does not start rotating until the rotational speed of the input shaft 2 reaches the predetermined value, whereas in disengaging the clutch 1, the internal pressure of the clutch piston 20 is maintained unchanged due to centrifugal force acting thereupon, to keep the clutch plate 21 urged against the clutch outer member 19 until the rotational speed of the input shaft 2 drops below a value lower than the predetermined value, at which the clutch 1 becomes disengaged, thus providing a hysteresis characteristic for the clutch 1, as shown in FIG. 2, to the clutch 1.

According to this embodiment, the maximum line pressure of fluid supplied from the pump 29 is maintained at a constant value by the regulator valve 95, the pump 29 being driven by the engine to supply hydraulic fluid proportional in pressure to the engine speed. Further, the pump 29 may alternatively be controlled by another driving means independently of the engine rotation, to control the force of the clutch piston 20 urging the clutch plates 21, 27.

Figure 3:
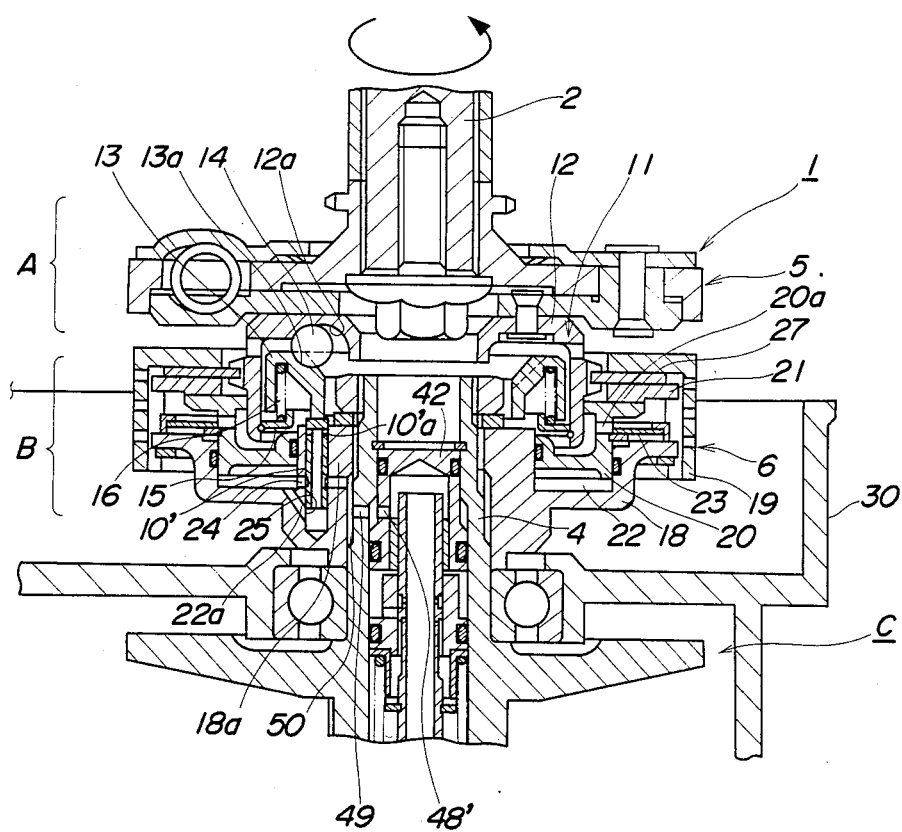
FIG. 3 is a fragmentary sectional view of an automatic transmission similar to one in FIG. 1, showing another example of a pressure regulating valve.

FIG. 3 shows another example of the pressure regulating valve 10 in FIG. 1. In the figure, the parts and elements bearing like reference numerals have like operations and functions as corresponding parts and elements in FIG. 1.

Figure 4:
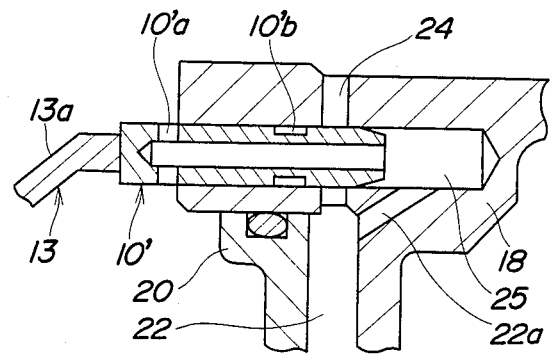
FIG. 4 is an enlarged sectional view of the pressure regulating valve in FIG. 3, in an operative position.

In FIG. 3, it is so arranged that the hydraulic pressure chamber 22 is supplied with hydraulic fluid via the inlet port 24 radially extending through the boss 18a of the clutch cylinder 18, and the hydraulic fluid introduced into the chamber 22 is discharged therefrom via a pressure regulating valve 10' axially slidably fitted in the bore 25 axially extending through the boss 18a of the clutch piston 20. The fitting bore 25 communicates at its axially intermediate portion with the inlet port 24 and opens at one end in an end face of the boss 18a of the clutch cylinder 18 facing the input rotating member 5. The pressure regulating valve 10' is adapted to move through a predetermined stroke axially of the drive shaft 4, and comprises a hollow cylindrical member having an open end and a closed opposite end. Radial outlet ports 10'a are formed through the peripheral wall of the valve 10' at a location adjacent its closed end, and an annular groove 10'b having a predetermined width is formed in the peripheral surface of the valve 10' at an axially central location (FIG. 4). A passage 22a communicates the hydraulic pressure chamber 22 with the fitting bore 25 at its closed end portion. The bearing cylinder 42 has a port 48' radially extending through its peripheral wall at a predetermined axial location, which does not have a positive throttling function as distinct from the orifice 48 in FIG. 1. The port 48' is communicated with the inlet port 24 of the hydraulic pressure chamber 22 via the first port 49 radially extending through the peripheral wall of the drive shaft 4, and a gap defined between the inner peripheral surface of the boss 18a of the clutch cylinder 18 and the annular groove 50 formed in the outer peripheral surface of the drive shaft 4.

Figure 5:
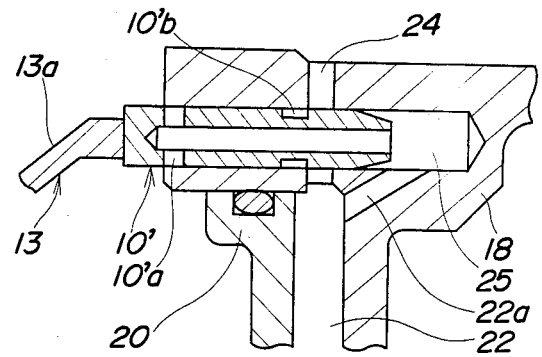
FIG. 5 is an enlarged sectional view of the pressure regulating valve of FIG. 3 in another operative position.
Figure 6:
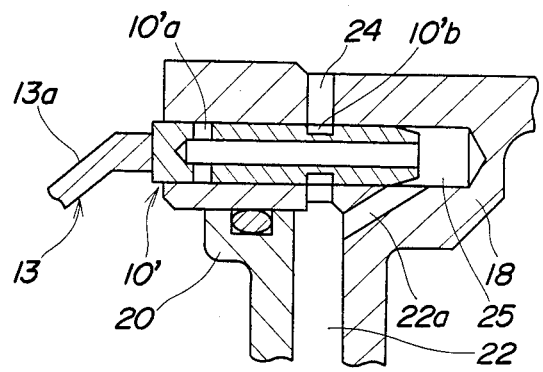
FIG. 6 is an enlarged sectional view of the pressure regulating valve in still another operative position.

When the rotational speed of the input shaft 2 is below the predetermined value, the pressure regulating valve 10' is in a position illustrated in FIG. 4, that is, it is biased toward the input rotating member 5 with its outlet ports 10'a open, by the hydraulic fluid introduced into the fitting bore 25 from the hydraulic pressure chamber 22 via the passage 22a. Since the hydraulic fluid in the hydraulic pressure chamber 22 is discharged through the outlet ports 10'a, the internal pressure of the chamber 22 does not increase and accordingly the clutch piston 20 is biased toward the output rotating member 6 by the urging force of the spring 23. On the other hand, when the rotational speed of the input shaft 2 is above the predetermined value, the pressure regulating valve 10' is urgedly displaced by the cam plate 13. To be specific, as the rotational speed of the input shaft 2 increases, the valve 10' first assumes a position illustrated in FIG. 5, wherein both the inlet port 24 and the outlet ports 10'a are closed, and thereafter assumes a position illustrated in FIG. 6, wherein the valve 10' is displaced toward the output rotating member 6 to open the inlet port 24 through the annular groove 10'b while closing the outlet ports 10'a, thereby allowing introduction of hydraulic fluid into the hydraulic pressure chamber 22 through the inlet port 24 to increase the pressure in the chamber 22 (point X in FIG. 7). When the pressure in the hydraulic pressure chamber 22 overcomes the urging force of the cam plate 13, the pressure regulating valve 10' is returned to the FIG. 4 position to close the inlet port 24 and open the outlet ports 10'a. Thus, the pressure in the hydraulic pressure chamber 22 is controlled in dependence on the pressure of the fluid urging the pressure regulating valve 10' and the force of the governor balls 14 urging the valve 10' via the cam plate 13.

To the arrangement of the pressure regulating valve 10' shown in FIG. 3, does not require the provision of an orifice or restriction upstream of the inlet port 24, which restricts the flow of the hydraulic fluid. Therefore, when the inlet port of the pressure regulating valve 10' is opened by the control means 11, a larger amount of hydraulic fluid can be introduced into the hydraulic pressure chamber per unit time, to thereby obtain high responsiveness of the urging means 20, i.e. promptly urge the friction plates to bring the input and output rotating members 5, 6 into a torque transmission permitting state within a short period of time.

Figure 8B:
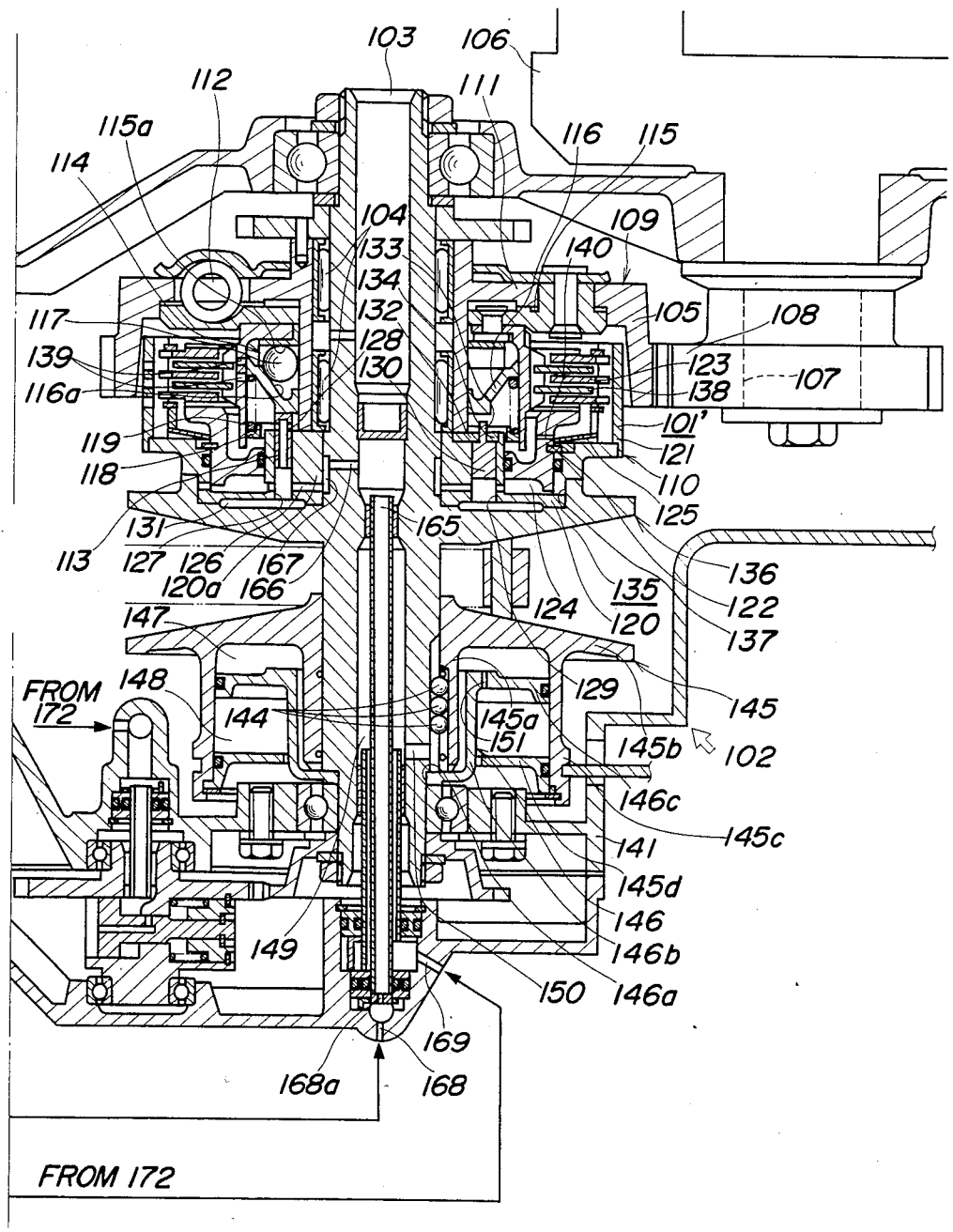
FIG. 8 consists of FIGS. 8a and 8b which show a sectional view of an automatic transmission similar to the one in FIG. 1, equipped with a starting clutch having means for restraining the operation of the pressure regulating valve, according to the invention.

FIG. 8 shows a starting clutch similar to one shown in FIG. 1, which is provided with restraining means for restraining the operation of the pressure regulating valve, and applied to an automatic transmission similar to but slightly different in structure from one shown in FIG. 1. In the figure, reference numeral 101' designates a starting clutch which is mounted on a drive shaft 103 of an automatic transmission 102. The starting clutch 101' has an input rotating member 109 mounted on the drive shaft 103 via bearings 104 and disposed to rotate in unison with an output shaft 107 of an internal combustion engine 106 through engagement between an outer gear 105 of the input rotating member 109 and a gear 108 formed on the engine output shaft 107, and an output rotating member 110 disposed to rotate in unison with the drive shaft 103.

A clutch damper 112 of a known type is attached to a disc 111 of the input rotating member 109, and control means 114, which controls a pressure regulating valve 113 hereinafter referred to, is mounted on the input rotating member 109 at a face thereof opposite the output rotating member 110. The control means 114 is of a centrifugal governor type and has a cam plate 116 axially slidably fitted within a housing 115 riveted to the input rotating member 109, and balls 117 radially movably interposed between a cam surface 116a of the cam plate 116 and a guide surface 115a of the housing 115. The cam plate 116 is urged toward the input rotating member 109 by a coiled spring 119 interposed between the cam plate 116 and a spring seat member 118. When the rotational speed of the output shaft 107 is lower than a predetermined value, the balls 117 are biased in a radially central position to bias the cam plate 116 in the position closest to the input rotating member 109 by the force of the spring 119. As the rotational speed of the output shaft 107 increases above the predetermined value, the balls 117 move radially outwardly due to centrifugal force acting thereupon, whereby the cam plate 116 is correspondingly displaced toward the output rotating member 110 against the urging force of the spring 119.

The output rotating member 110 comprises a clutch cylinder 120 rigidly fitted on the drive shaft 103, and a clutch outer member 121 rigidly fitted on the clutch cylinder 120 in a manner prohibited from moving circumferentially as well as axially relative to the clutch cylinder 120. A clutch piston 122 as urging means is axially slidably fitted within the cylinder 120, for displacement in response to hydraulic fluid or pressurized oil introduced into a hydraulic pressure chamber 124 defined between the piston 122 and the cylinder 120, to urge friction plates formed by clutch plates 123 and 138, hereinafter referred to. The piston 122 is urged by a belleville spring 125 toward the output rotating member 110.

The hydraulic pressure chamber 124 is supplied with hydraulic fluid via an inlet port 126 radially extending through a boss 120a of the cylinder 120. A bore 127 serving as an outlet port of the hydraulic pressure chamber 124 is axially formed through the boss 120a of the cylinder 120, and within which is slidably received the aforementioned pressure regulating valve 113. The bore 127 communicates at one end with the inlet port 126 and opens at its other end in an end face of the boss 120a of the cylinder 120 facing the input rotating member 109. The pressure regulating valve 113 can move through a predetermined stroke axially of the drive shaft 103, and comprises a hollow cylindrical member opening at one end and closed at its other end. The closed end of the pressure regulating valve 113 is brought into contact with an end face of the cam plate 116 facing the output rotating member 110, by the pressure of hydraulic fluid. Radial outlet ports 128 are formed through the peripheral wall of the valve 113 at a location in the vicinity of its closed end.

Another axial bore 129 is formed through the boss 120a of the clutch cylinder 120 at a location diametrically opposite the bore 127 with respect to the drive shaft 103, and a piston 130 having a predetermined diameter, received within the bore 129 as restraining means. The bore 129 communicates with the bore 127 through a communication chamber 131 so that part of the hydraulic fluid being delivered to the hydraulic pressure chamber 124 from the inlet port 126 is supplied to the bore 129. The piston 130 is always urged by the hydraulic fluid toward the input rotating member 109, while its movement toward the input rotating member 109 is limited by a plate-like stopper 132 attached to the end face of the boss 120a of the clutch cylinder 120 facing the input rotating member 109. The piston 130 has a shaft disposed to be slidably fitted through a guide bore 134 formed through the stopper 132 in concentricity with the fitting bore 129.

The clutch cylinder 120 is rigidly fitted in a recess 137 formed in an end face of an immovable conical disc element 136 which is close to the starting clutch, forms part of a driving pulley 135, hereinafter referred to, and projects integrally from the drive shaft 103. The communication chamber 131 is defined between a bottom surface of the recess 137 and an end face of the clutch cylinder 120 remote from the clutch 101'.

When the rotational speed of the output shaft 107 is lower than the predetermined value, the pressure regulating valve 113 is biased in the position closest to the input rotating member 109 by hydraulic fluid supplied through the inlet port 126, whereby the outlet ports 128 are opened to discharge hydraulic fluid within the hydraulic pressure chamber 124 therethrough. Therefore, the pressure in the chamber 124 does not increase, thereby allowing the clutch piston 122 to be biased toward the output rotating member 110 by the urging force of the spring 125. On this occasion, the piston 130 is urged by the fluid pressure to be held in contact with the stopper 132, with its shaft 133 projected from an end face 132a (FIG. 9) of the stopper 132 by a predetermined length. However, an end face 133a of the shaft 133 of the piston 130 is then spaced from an end face 116b of the cam plate 116 by a predetermined distance. In FIG. 8, the pressure regulating valve 113 and the piston 130 are seen positioned in their respective positions assumed when the rotational speed of the output shaft 107 is below the predetermined value, that is, the cam plate 116 is biased by the urging force of the spring 119 in the position closest to the input rotating member 109.

Figure 9:
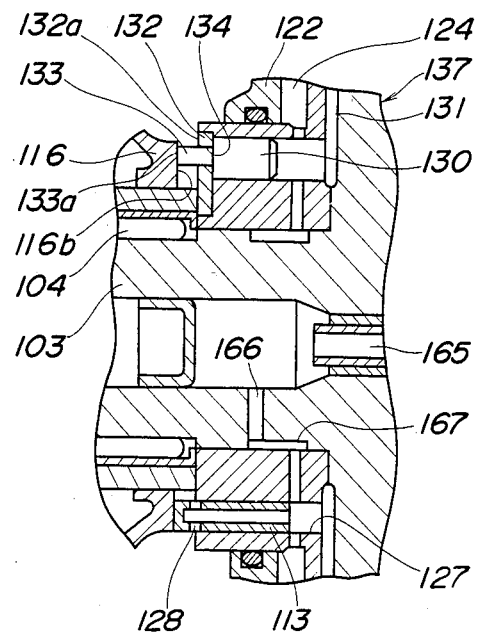
FIG. 9 is an enlarged view of the restraining means in FIG. 8, in an operative state.

As the rotational speed of the output shaft 107 increases above the predetermined value, the cam plate 116 is displaced toward the output rotating member 110 against the force of the spring 119, to urge the pressure regulating valve 113. However, when the end face 116b of the cam plate 116 abuts against the end face 133a of the shaft 133 of the piston 130, the force of the piston 130 counteracts the urging force of the cam plate 116, to thereby prevent further displacement of the cam plate 116 toward the output rotating member 110 (FIG. 9). With the above displacement of the cam plate 116 toward the output rotating member 110, the outlet ports 128 of the pressure regulating valve 113 have their opening areas gradually reduced. When the displacement of the cam plate 116 is impeded by the piston 130, the outlet ports 128 of the valve 113 have their openings maintained at a predetermined value.

Figure 10:
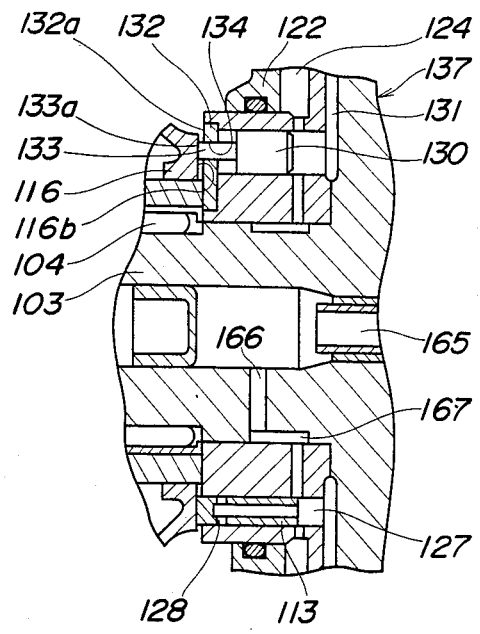
FIG. 10 is an enlarged view of the restraining means and the pressure regulating valve in FIG. 9, in another operative postion.

As the rotational speed of the output shaft 107 then further increases so that the cam plate 116 urges the piston 130 with an increased force large enough to overcome the force P1 of the piston 130, the cam plate 116 is again displaced while urgingly displacing the pressure regulating valve 113 toward the output rotating member 110 against the forces of the spring 119 and the piston 130, to close the outlet ports 128 of the valve 113, as shown in FIG. 10. Even after the cam plate 116 thus again starts to displace the pressure regulating valve 113, the force P1 of the piston 130 keeps counteracting the urging force W2 of the cam plate 116.

The piston 130 is intended to restrain the displacement of the cam plate 116 toward the output rotating member 110 after the rotational speed of the output shaft 107 of the engine 106 becomes larger than a particular speed between a speed at which the clutch starts to engage (hereinafter called "the clutch-in speed"), and a speed at which engagement of the clutch is completed, i.e. no slippage occrus in the clutch (hereinafter called "the clutch-stall speed"). The force imparted by the piston 130 is large enough to overcome the counteracting force W1 of the cam plate 116 dependent on the rotational speed of the output shaft 107 for a given range of rotational speed after the rotational speed of the output shaft 107 has become larger than the particular speed. Thereafter, although the urging force W2 of the cam plate 116 overcomes the force of the piston 130, the piston 130 keeps urging the cam plate 116 with the force P1. This force P1 applied against the cam plate 116 is given by a product value of the cross-sectional area, i.e. pressure-receiving surface area, and the pressure of the hydraulic fluid source which is constant.

Figure 11:
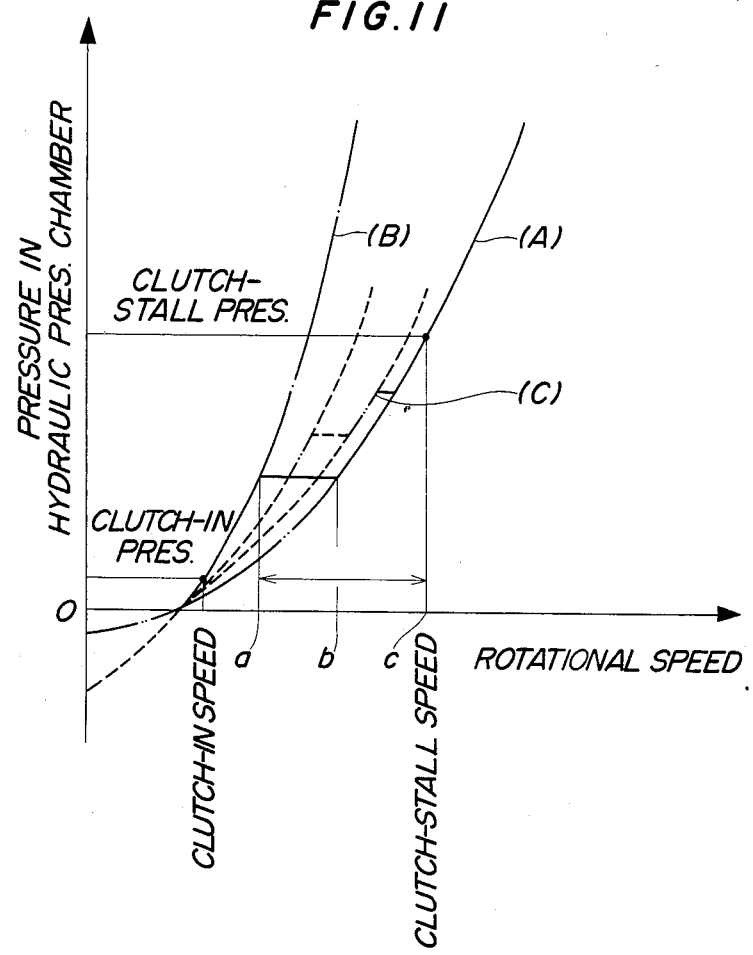
FIG. 11 is a graph showing the relationship between the rotational speed of the input shaft of the starting clutch in FIG. 8 and the operating fluid pressure.

FIG. 11 shows characteristic curves of pressure within the hydraulic pressure chamber 124. The solid line (A) is a pressure characteristic wherein the piston 130 is operated in the aforedescribed manner, while the one-dot chain line (B) is a pressure characteristic wherein the piston 130 is omitted and therefore has no influence over the pressure in the chamber 124. According to the pressure characteristic indicated by the solid line (A), there exists a range of rotational speed (between a and b) wherein the pressure in the hydraulic pressure chamber 124 does not increase but remains constant while the rotational speed of the output shaft 107 rises from the clutch-in speed to the clutchstall speed. While the rotational speed of the output shaft 107 falls within the range between a and b, the force P1 imparted by the piston 130 surpasses the counteracting force W1 of the cam plate 116 (i.e. P1>W1). That is, the cam plate 116 is prevented from moving toward output rotating member 110 by the piston 130 while the rotational speed of the output shaft 107 increases from the point a at which the end face 116b of the cam plate 116 is brought into contact with the end face 133a of the shaft 133 of the piston 130, to the point b at and above which the urging force W2 of the cam plate 116 surpasses the force P1 of the piston 130. Therefore, the opening area of the outlet ports 128 of the pressure regulating valve 113 does not change during the range of a–b, maintaining the pressure in the hydraulic pressure chamber 124 at a constant value. Although the urging force W2 of the cam plate 116 becomes larger than the force P1 of the piston 130 at the point b (P1<W2), the piston 130 keeps counteracting the force W2 of the cam plate 116 until the point c (the clutch-stall speed) is reached. That is, although the piston 130 impedes the displacement of the cam plate 116 toward the output rotating member 110 during the range between the points a and b, it substantially restrains the movement of the cam plate 116 over the range of a–c.

Thus, by providing a range of rotational speed wherein the pressure in the hydraulic pressure chamber 24 does not increase but remains constant, i.e. between the clutch-in speed and the clutch-stall speed, not only an abrupt increase of the pressure in the hydraulic pressure chamber 124 can be prevented, but also the slipping period of the clutch can be prolonged, thereby ensuring smooth power transmission through the clutch and accordingly smooth starting of the vehicle.

The location of the point a relative to the rotational speed of the output shaft 107 can optionally be changed, by changing the distance between the end face 133a of the shaft 133 of the piston 130 and the end face 116b of the cam plate 116. Also, by changing the cross-sectional area of the piston 130 with provision of a different number of pistons, the force P1 applied against the cam plate and accordingly the point b can be changed to any other desired location. Further, a plurality of pistons having respective different operating points a and b may be used to control the pressure in the chamber 124 in a stepwise manner, as indicated by the two-dot chain line (C) in FIG. 11.

Although in the embodiment shown in FIG. 8, the force P1 applied against the cam plate is obtained by the fluid pressure acting upon the piston 130, a coiled spring may alternatively be employed to urge the piston 130 against the cam plate. In this case, by changing the setting load of the spring, the force P1 and accordingly the point b can optionally be changed.

Figure 12:
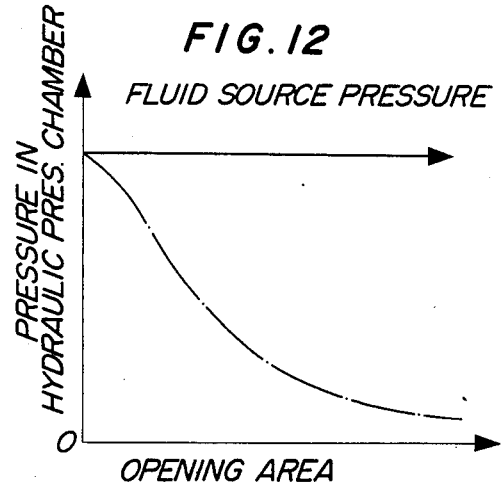
FIG. 12 is a graph showing the relationship between the opening area of outlet ports of the pressure regulating valve and the pressure in a hydraulic pressure chamber of the starting clutch.

FIG. 12 shows the relationship between the opening area of the outlet ports 128 of the pressure regulating valve 113, which is displaced by the cam plate 116, and the pressure in the hydraulic pressure chamber 124, wherein the opening area of the inlet port 126 and the fluid pressure P2 supplied to the chamber 124 are both constant.

A plurality of clutch plates 123 to be urged by the clutch piston 122 are interposed between the input and output rotating members 109 and 110, and fitted in the clutch outer member 121 in a manner circumferentially immovable but axially movable relative to the clutch outer member 121. Clutch plates 138 are each interposed between adjacent ones of the clutch plates 123, and fitted on the governor housing 115 in a manner such that they can move axially but is prohibited from moving circumferentially relative to the housing 115. As the clutch piston 122 urges the clutch plates 123 against the clutch plates 138, torque is transmitted from the input rotating member 109 to the output rotating member 110, whereas with the clutch piston 122 is inoperative, no torque transmission takes place between the input and output rotating members 109, 110.

The governor housing 115 and the clutch piston 122 have their respective peripheral walls formed with hydraulic fluid distributing bores 139 and 140, so that the hydraulic fluid discharged from the hydraulic pressure chamber 124 via the outlet ports 128 and delivered to the interior of the housing 115 or the space between the housing 115 and the clutch piston 122 is introduced via the distribution bores 139 or 140 to the sliding portions of the clutch plates 138, to thereby prevent seizure of the sliding portions of the clutch plates 138 particularly in a half-engaged state. The inlet port 126 is connected to an oil pump P as a hydraulic fluid supply source, which is driven by the input shaft 103 to supply hydraulic fluid having a pressure dependent on the rotational speed of the input shaft 103.

The arrangement of the automatic transmission 102 equipped with the starting clutch 101' constructed as above will now be described.

The automatic transmission 102 comprises a casing 141, the drive shaft 103, a driven shaft 142, the driving pulley 135 mounted on the drive shaft 103, and a driven pulley 143 mounted on the driven shaft 142.

The driving pulley 135 comprises a disc-shaped stationary element 136 formed integrally with the drive shaft 103 of the starting clutch 101', and a movable element 145 fitted via a plurality of balls 144 on the drive shaft 103 in a manner axially movable but circumferentially immovable relative to the drive shaft 103. The movable pulley element 145 has a cylindrical boss 145a, a disc-shaped main body 145b projecting integrally from one end of the boss 145a, a cylindrical peripheral wall 145c axially projecting integrally from the main body 145b in a direction away from the immovable conical disc element 136, and an annular plate 145d fitted in the inner peripheral surface of the projecting end of the peripheral wall 145c.

Received within the movable pulley element 145 is a stationary piston 146 which has a cylindrical body 146b having one end wall formed with a fitting bore 146a and opening at its other end, and an annular radial flange 146c projecting integrally from the other end of the cylindrical body 146b. The stationary piston 146 is circumferentially and axially immovably fitted on the drive shaft 103 at its fitting bore 146a, and its cylindrical body 146b is loosely fitted on the boss 145a of the movable pulley element 145, while the flange 146c has its outer peripheral surface slidably received in the cylindrical peripheral wall 145c of the movable pulley element 145 in a liquidtight manner.

A first hydraulic pressure chamber 147 is defined between the main body 145b of the movable pully element 145 and the flange 146c of the stationary piston 146, while a second hydraulic pressure chamber 148 is defined between the closing plate 145d of the movable pulley element 145 and the flange 146c of the stationary piston 146. The first hydraulic pressure chamber 147 is connected to the pump P via a hydraulic fluid introducing passage 149 axially formed though the drive shaft 103 and a port 150 radially extending through the peripheral wall of the drive shaft 103. An orifice 151 is formed through the flange 146c to communicate the first and second hydraulic pressure chambers 147, 148 with each other, whereby hydraulic fluid in the first hydraulic pressure chamber 147 is introduced into the second hydraulic pressure chamber 148 via the orifice 151.

The driving pulley 135 has the maximum pitch when it is in a position as illustrated. As the hydraulic fluid is introduced into the first hydraulic pressure chamber 147 through the port 150, the movable pulley element 145 is displaced toward the immovable conical disc element 136, to thereby reduce the pitch of the driving pulley 135.

The driven pulley 143 comprises a stationary element 152 formed integrally with the driven shaft 142 at its outer periphery, and a movable element 154 fitted via a plurality of balls 153 on the driven shaft 142 in a manner axially movable but circumferentially immovable relative to the driven shaft 142.

The movable pulley element 154 has a cylindrical boss 154a, a disc-shaped main body 154b projecting integrally from one end of the boss 154a, a cylindrical peripheral wall 154c axially projecting integrally from a radially intermediate portion of the main body 154b in a direction away from the immovable conical disc element 152, and an annular plate 154d secured to the inner peripheral surface of the projecting end of the peripheral wall 154c. The inner diameter of the peripheral wall 154c of the movable pulley element 154 is almost equal to that of the peripheral wall 145c of the movable pulley element 145 of the driving pulley 135.

Received within the movable pulley element 154 is a stationary piston 155 which has a cylindrical body 155b having one end wall formed with a central fitting bore 155a and opening at its other end, and an annular radial flange 155c projecting integrally from the other end of the cylindrical body 155b. The stationary piston 155 is circumferentially and axially immovably fitted on the driven shaft 142 at its fitting bore 155a, and its cylindrical body 155b is loosely fitted on the boss 154a of the movable pulley element 154, while its radial flange 155c has its outer peripheral surface slidably received in the cylindrical peripheral wall 154c of the movable pulley element 154 in a liquidtight manner.

A coiled spring 156 is interposed between the main body 154b of the movable pulley element 154 and the flange 155c of the stationary piston 155, to urge the movable pulley element 154 toward the immovable conical disc element 152, i.e. in a direction of reducing the pitch of the driven pulley 143. The spring 156 serves to keep an endless belt 157, which is wound around the two pulleys 135, 143, in properly taut state and hold the movable pulley element 154 in an initial or low speed providing position, when the engine is at rest.

A first hydraulic pressure chamber 158 is defined between the main body 154b of the movable pully element 154 and the flange 155c of the stationary piston 155, while a second hydraulic pressure chamber 159 is defined between the closing plate 154d of the movable pulley element 154 and the flange 155c of the stationary piston 155. These first and second hydraulic pressure chambers 158, 159 communicate with each other via an orifice 160 axially formed through the flange 155c of the stationary piston 155.

The first hydraulic pressure chamber 158 is communicated with the pump P via a hydraulic fluid introducing passage 161 formed through the driven shaft 142 along its axis, and a port 162 radially extending through the peripheral wall of the driven shaft 142.

The driven shaft 142 has bores 164 radially extending through its peripheral wall at a location in the vicinity of the inner or lower end of the immovable conical disc element 152, to communicate a hydraulic fluid introducing passage 163 axially formed through the driven shaft 140 with the outside of same. The bores 164 are opened and closed by the boss 154a of the movable pulley element 154 as the element 154 slides on the driven shaft 142. When the bores 164 are opened, hydraulic fluid in the passage 163 is delivered to the outside of the driven shaft 142 through the bores 164 to lubricate the belt 157.

When the driven pulley 143 is in the illustrated position, its pitch assumes the minimum value whereby a largest amount of the hydraulic fluid is then supplied to the first hydraulic pressure chamber 158. As hydraulic fluid is drained from the first hydraulic pressure chamber 158 through the port 162, the movable pulley element 154 is allowed to move away from the immovable conical disc element 152, i.e. in a direction of increasing the pitch of the driven pulley 143, against the force of the spring 156.

The inlet port 126 of the starting clutch 101' is connected to a hydraulic fluid introducing passage 165 formed through the drive shaft 103 along its axis, via an annular groove 167 formed in the outer peripheral surface of the drive shaft 103, and a port 166 radially extending through the peripheral wall of the drive shaft 103. The passage 165 is directly supplied with hydraulic fluid from the pump P through an orifice 168a, and a port 168 formed through the casing 141. Therefore, the hydraulic fluid introduced into the hydraulic pressure chamber 124 via the inlet port 126 has a pressure dependent on the rotational speed of the input shaft 103. The hydraulic fluid from the pump P is delivered to the passage 149 in the driving pulley 135 through a regulator 172 and a port 169 formed through the casing 141, and also delivered to the passage 161 in the driven pulley 143 through the regulator 172 and a port 170, while the passage 163 in the driven pulley 143 is supplied with hydraulic fluid directly from the pump P solely through a port 171.

The regulator 172 regulates the pressure of fluid from the pump P to a predetermined constant value, and then delivers to the driving pulley 135 and the driven pulley 143.

With the automatic transmission constructed as above, when the engine 106 starts and the clutch 101' is engaged to transmit engine torque from the engine output shaft 107 to the drive shaft 103, torque is then transmitted from the drive shaft 103 to the driven shaft 142 through the driving pulley 135, the endless belt 157 and the driven pulley 143. While torque is transmitted from the drive shaft 103 to the driven shaft 142, the speed ratio between the driving pulley 135 and the driven pulley 143 can be varied in a stepless manner by moving the respective movable pulley elements 145, 154 through the fluid pressure so as to change the pitch diameters of the pulleys 135, 143. On the other hand, when the clutch 101' is disengaged while the engine is operating, no torque is transmitted from the output shaft 107 to the drive shaft 103, holding the transmission inoperative.

Although in the foregoing embodiments, the starting clutch according to the invention is applied to an automatic transmission for vehicles, it may alternatively be applied to power transmission means of other types and for other uses.

What is claimed is:

1. A hydraulic type starting clutch comprising:
   an input shaft;
   an input rotating member arranged for rotation in unison with said input shaft;
   an output shaft;
   an output rotating member arranged for rotation in unison with said output shaft;
   friction plates interposed between said input rotating member and said output rotating member for engagement therewith to transmit torque from said input rotating member to said output rotating member;
   urging means interposed between said friction plates and said output rotating member for urging said friction plates to cause said transmission of torque from said input rotating member to said output rotating member;
   a hydraulic pressure chamber defined between said urging means and said output rotating member and disposed to be supplied with a hydraulic fluid for acting upon said urging means to urge said friction plates;
   a hydraulic fluid source for supplying said hydraulic fluid to said hydraulic pressure chamber;
   pressure regulating valve means for regulating the pressure of said hydraulic fluid in said hydraulic pressure chamber; and
   control means for controlling said pressure regulating valve means to regulate the pressure of said hydraulic fluid in said hydraulic pressure chamber so as to increase with an increase in the rotational speed of said input shaft, said control means comprising:
      a governor housing secured to said input rotating member, and
      actuating means operable in response to the rotational speed of said input shaft to actuate said pressure regulating valve means, said actuating means being arranged within said governor housing and directly engaging said pressure regulating valve means for urgingly displacing the same;
   said urging means being responsive to the hydraulic fluid pressure increased by said control means to urge said friction plates to cause transmission of torque from said input rotating member to said output rotating member when the rotational speed of said input shaft reaches a predetermined low speed value.

2. A hydraulic type starting clutch as claimed in claim 1, wherein said hydraulic pressure chamber has an outlet port for discharging said hydraulic fluid toward said friction plates, said pressure regulating valve means being arranged at said outlet port.

3. A hydraulic type starting clutch as claimed in claim 1, wherein said hydraulic fluid source is adapted to generate a hydraulic fluid having a pressure dependent upon the rotational speed of said input shaft.

4. A hydraulic type starting clutch as claimed in claim 1, including a passage connected to said hydraulic fluid source, said hydraulic pressure chamber being connected to said passage, and a restriction provided in said passage for restricting the flow of said hydraulic fluid.

5. A hydraulic type starting clutch as claimed in claim 1, including restraining means for restraining the operation of said pressure regulating valve means, when the rotational speed of said input shaft increases above a predetermined value between a value at which said friction plates start to engage, and a value at which engagement of said friction plates is completed.

6. A hydraulic type starting clutch as claimed in claim 1, wherein said hydraulic pressure chamber has an inlet port and an outlet port, said pressure regulating valve means being adapted to selectively open or close said inlet port and said outlet port.

7. A hydraulic type starting clutch as claimed in claim 1, wherein
said friction plates include at least a first clutch plate and a second clutch plate,
said first clutch plate being mounted on said output rotating member in a manner circumferentially immovable and axially movable relative to said output rotating member,
said second clutch plate being mounted on said governor housing at an outer periphery thereof in a manner circumferentially immovable and axially movable relative to said govenor housing.

8. A hydraulic type starting clutch as claimed in claim 1, wherein said control means is arranged to operate in unison with rotation of said input shaft,
said urging means being disposed on a side of said oukyput shaft and having a pressure receiving portion upon which the pressure within said hydraulic pressure chamber acts,
said pressure regulating valve means being radially inwardly arranged with respect to an outer periphery of said pressure receiving portion of said urging means,
said pressure regulating valve means having an inlet port for introducing pressure into said hydraulic pressure chamber at a location radially inward of said outer periphery of said pressure receiving portion of said urging means.

9. A hydraulic type starting clutch comprising:
an input shaft;
an input rotating member arranged for rotation in unison with said input shaft;
an output shaft;
an output rotating member arranged for rotation in unison with said output shaft;
friction plates interposed between said input rotating member and said output rotating member for engagement therewith to transmit torque from said input rotating member to said output rotating member, said friction plates including at least a first clutch plate and a second clutch plate,
said first clutch plate being mounted on said output rotating member in a manner circumferentially immovable and axially movable relative to said output rotating member;
urging means interposed between said friction plates and said output rotating member for urging said friction plates to cause said transmission of torque from said input rotating member to said output rotating member;
a hydraulic pressure chamber defined between said urging means and said output rotating member and disposed to be supplied with a hydraulic fluid for acting upon said urging means to urge said friction plates;
a hydraulic fluid source for supplying said hydraulic fluid to said hydraulic pressure chamber;
pressure regulating valve means for regulating the pressure of said hydraulic fluid in said hydraulic pressure chamber; and
control means for controlling said pressure regulating valve means to regulate the pressure of said hydraulic fluid in said hydraulic pressure chamber so as to increase with an increase in the rotational speed of said input shaft, said urging means being responsive to the hydraulic fluid pressure increased by said control means to urge said friction plates to cause transmission of torque from said input rotating member to said output rotating member when the rotational speed of said input shaft reaches a predetermined low speed value, said control means comprising:
a governor housing secured to said input rotating member, and
means operable in response to the rotational speed of said input shaft to actuate said pressure regulating valve means;
said second clutch plate being mounted on said governor housing at an outer periphery thereof in a manner circumferentially immovable and axially movable relative to said governor housing.

* * * * *